United States Patent [19]

Elliott

[11] Patent Number: 4,678,712
[45] Date of Patent: Jul. 7, 1987

[54] CURABLE COATING COMPOSITION AND EPOXY RESIN ADDUCT USEFUL THEREIN

[75] Inventor: Brian W. Elliott, Alconbury, Great Britain

[73] Assignee: The Dow Chemical Company, Midland, Mich.

[21] Appl. No.: 815,081

[22] PCT Filed: Apr. 12, 1985

[86] PCT No.: PCT/GB85/00167
§ 371 Date: Feb. 3, 1986
§ 102(e) Date: Feb. 3, 1986

[87] PCT Pub. No.: WO85/04666
PCT Pub. Date: Oct. 24, 1985

[30] Foreign Application Priority Data

Apr. 13, 1984 [GB] United Kingdom ............ 8409670

[51] Int. Cl.$^4$ ............................................. C08G 59/64
[52] U.S. Cl. ............................. 428/418; 427/13; 427/386; 525/504; 528/111; 528/104
[58] Field of Search .............. 528/111, 104; 525/504; 427/13, 386; 428/418

[56] References Cited

U.S. PATENT DOCUMENTS

| | | | |
|---|---|---|---|
| 3,317,471 | 5/1967 | Johnson et al. | 528/111 |
| 4,152,285 | 5/1979 | Thomassen | 528/111 X |
| 4,162,244 | 7/1979 | Bertram | 528/111 X |
| 4,246,148 | 1/1981 | Shimp et al. | 260/18 EP |
| 4,330,644 | 5/1982 | Allen | 528/111 X |

FOREIGN PATENT DOCUMENTS

2846114 4/1980 Fed. Rep. of Germany .
1103325 2/1968 United Kingdom .

*Primary Examiner*—Earl Nielsen

[57] ABSTRACT

A curable coating composition is prepared from two components; (1) a component having more than one epoxide group (an epoxy resin) and (2) a component having more than one group reactive with the epoxy groups of components (1) (i.e., a polyhydric phenol). Either component (1) or (2) is the reaction product of a compound containing at least one primary or secondary amino group and at least one aliphatic hydroxyl group with an epoxy resin and optionally a component reactive therewith. This reaction product contains terminal aliphatic hydroxyl groups and epoxy groups or groups reactive with epoxy groups. The components (1) and (2) are preferably normally solid materials and the coating composition is a powder coating composition. The coatings prepared from these powder coating compositions which contain the adduct having both aliphatic -OH and epoxy or phenolic -OH groups exhibit significantly improved adhesion when applied to a metal substrate, including an untreated mild steel substrate, then a conventional epoxy resin, powder coating composition.

5 Claims, No Drawings

CURABLE COATING COMPOSITION AND EPOXY RESIN ADDUCT USEFUL THEREIN

BACKGROUND OF THE INVENTION

This invention relates to an adduct having terminal aliphatic —OH groups, a curable coating composition containing this adduct, a method for coating a substrate using this composition and to coated articles prepared therefrom.

Due to their physical and chemical properties such as high resistance to chemical attack and good adhesion to various substrates, epoxy resins are useful in the preparation of coatings. The epoxy resins can be applied from organic or aqueous solutions onto a variety of different substrates or sprayed, in a powder form, onto a metal substrate using electrostatic techniques.

Conventionally, in preparing a powder coating using an epoxy resin, the epoxy resin is blended with a hardener such as a compound containing one or more reactive phenolic hydroxyl groups, which reacts with the epoxide groups to form a hard, infusible coating. For example, a high molecular weight epoxy resin coating has been prepared in situ on a suitable substrate by applying a mixture of a solid component having more than one 1,2-epoxy group, a solid component having more than one phenolic hydroxyl group and a suitable catalyst to a substrate and subsequently heating the coated substrate to effect the reaction between the epoxy containing component and the phenolic hydroxyl containing component. If desired, the mixture can also contain dyes, pigments and flow control agents. The phenolic —OH containing component is prepared by reacting an excess of a phenolic compound having more than one phenolic —OH group with an epoxy compound having more than one epoxide group.

Although the adhesion of the coating prepared from the described epoxy resin composition to the substrate is generally sufficient, the adhesion of the cured resin coating to various metal substrates such as untreated mild steel substrates, could be improved, particularly when the cured coating is subjected to humid conditions.

Accordingly, this invention provides a curable coating composition useful in preparing a coating having improved adhesion. The curable coating composition comprises (1) a component having more than one 1,2-epoxy group and (2) a component having more than one group reactive with the epoxy groups of component (1) wherein at least one of components (1) and (2) is an adduct formed by reacting a compound containing at least one primary or secondary amino group and at least one aliphatic hydroxyl group with an epoxy resin and optionally a component reactive with the epoxy resin, said reaction product having terminal aliphatic —OH groups, and having epoxy groups or groups reactive with an epoxy group. Preferably, component (2) is a compound having more than one phenolic —OH group. Optionally, the coating composition can contain a catalyst for promoting the reaction between the epoxy and phenolic —OH groups and other adjuncts such as pigments, dyes and flow control agents. The reaction product of the compound containing at least one primary or secondary amino group and at least one aliphatic hydroxyl group with an epoxy resin and optionally a component reactive with the epoxy resin comprises an adduct of the epoxy resin with the compound containing at least one primary or secondary amino group and at least one aliphatic hydroxyl group, and may also include other materials, specifically unreacted starting material.

In a preferred embodiment, the coating composition is a powder coating composition. The powder coating composition of the present invention comprises (1) a component containing more than one 1,2-epoxy group, (2) a component having more than one phenolic —OH group wherein component (1) and/or component (2) is the reaction product of an epoxy resin or an epoxy resin and polyhydric phenol with a compound containing at least one primary or secondary amino group and at least one aliphatic hydroxyl group; said reaction product having terminal aliphatic —OH groups and epoxy or phenolic —OH groups. Preferably, both components (1) and (2) are normally solid materials, i.e., materials solid at room temperature (e.g., 20° to 25° C.).

The described powder coating composition which contains the reaction product of a compound containing epoxy or phenolic —OH groups with an aliphatic —OH containing amine exhibits significantly improved adhesion when applied to a metal substrate, including an untreated mild steel substrate. Although the powder coating composition of the present invention is particularly advantageous when applied to a steel substrate, it can also suitably be employed with other metallic substrates as well as substrates of other materials, including plastic or glass, which will withstand temperatures of at least 100° C.

In a particularly preferred embodiment of the present invention, the powder coating composition will contain the reaction product of an epoxy resin, a polyhydric phenol and the aliphatic —OH containing amine. The resulting reaction product will contain aliphatic —OH groups and depending on the relative ratio of the equivalents of the epoxy resin and polyhydric phenol employed, phenolic —OH groups or epoxy groups. In general, the reaction product is advantageously prepared at conditions such that it contains phenolic —OH groups and terminal aliphatic —OH groups and another aspect of this invention provides such an adduct. The powder coating composition prepared using this adduct preferably comprises the adduct, a solid epoxy resin, and, optionally, a catalyst and other adjuncts.

Alternatively, the epoxy resin and polyhydric phenol are employed in concentrations sufficient to form an adduct containing epoxy groups and aliphatic —OH groups and yet another aspect of the present invention provides such an adduct. This adduct can also be prepared by reacting the aliphatic —OH containing amine with an epoxy resin only. In this embodiment, the resulting aliphatic —OH containing epoxy resin is blended with a polyhydric phenol to form the powder coating composition of the present invention.

In the practice of the present invention, a primary or secondary amine having an aliphatic —OH group is reacted with a compound containing more than one epoxide group and, optionally a compound having more than one group, preferably phenolic —OH group, reactive with the epoxy groups of the epoxy resin. Aliphatic hydroxyl-containing amines suitably employed herein are those compounds containing one or more primary or secondary amino groups and one or more aliphatic hydroxyl groups. By the term "aliphatic hydroxyl group" it is meant that the oxygen atom of the hydroxyl group is not attached directly to an aryl ring. For example, the hydroxyl group of phenol is not an aliphatic hydroxyl group whereas the hydroxyl group of benzyl alcohol is considered an aliphatic hydroxyl group.

Representative examples of aliphatic hydroxyl-containing amines are the monoamines having two alkanol substituted groups (dialkanolamines) such as diethanolamine, dipropanolamine and ethanolpropanolamine; monoamines having one alkanol substituent such as ethanolamine and monoamines having one alkanol substituent and one other substituent group such as ethanolethylamine, methylethanolamine and benzylethanolamine and polyamines such as N,N'—diethanol ethylene diamine. Preferred of the aliphatic —OH containing amines are the secondary monoamines. More preferably, the aliphatic —OH containing amine is a dialkanol monoamine, with diethanolamine being most preferred.

In the preparation of this adduct, the epoxy resin component is suitably any compound which possesses more than one 1,2-epoxy group. In general, the epoxy resin component is saturated or unsaturated aliphatic, cycloaliphatic, aromatic or heterocyclic and can be substituted with one or more non-interfering substituents such as halogen atoms, phosphorous atoms, hydroxyl groups and ether radicals. The epoxy resin component can be monomeric or polymeric.

Illustrative examples of epoxy resins useful herein are described in *The Handbook of Epoxy Resins* by H. L. Lee and K. Neville, published in 1967 by McGraw-Hill, New York, in appendix 4-1, pgs. 4-35 thru 4-56.

Epoxy resins of particular interest in the practice of this embodiment include the polyglycidyl ethers of bisphenol compounds represented by the general structural formula:

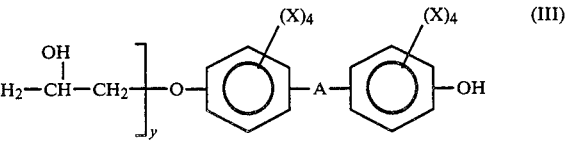

wherein each A is independently a divalent hydrocarbon group having from 1 to 8 carbon atoms, —C—, —O—, —S—S—, —S—, —S(O)₂—, —S(O)— or a covalent bond; each X is independently hydrogen, chlorine, bromine or an alkyl group of 1 to 4 carbon atoms and n has an average value of 0 to 0.5; the polyglycidyl ethers of a novolac resin, i.e., phenol aldehyde condensates of the formula:

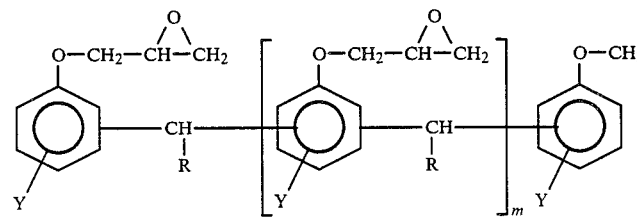

wherein each R is independently hydrogen or an alkyl radical having from 1 to 4 carbon atoms, each y is an independently hydrogen, chlorine, bromine or a lower alkyl group and m has an average value from 0 to 10; polyglycidyl ethers of polyglycol such as the diglycidyl ether of polypropylene glycol and the polyglycidyl ethers of tris(phenol)methane. Mixtures of one or more epoxy resins are also suitably employed herein.

Preferred epoxy resins are the polyglycidyl ethers of bisphenol compounds of formula (I) wherein each A is independently a divalent hydrocarbon group having from 1 to 6 carbon atoms, each X is independently hydrogen or bromine and n has an average value of from 0 to 0.25, and the polyglycidyl ethers of a novolac resin of formula (II) wherein R rs hydrogen or methyl, each Y is hydrogen or methyl and m has an average value of from 0 to 3 and mixtures thereof. Most preferred as an epoxy resin is the liquid diglycidyl ether of bisphenol A.

The polyhydric phenol component advantageously employed in preparing the adduct is a normally solid material and includes polyhydric phenols represented by the following general formulae:

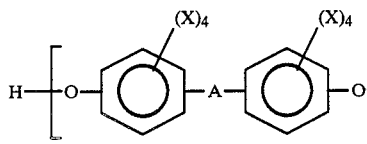 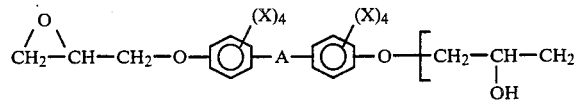

wherein A and X are as defined above in the description of formula (I) and y has an average value of 0 to 5, preferably from 0 to 2 and

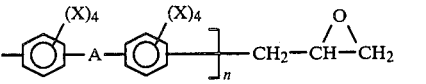

(commonly referred to as a novolac resin) wherein R, Y and m are defined as above with reference to formula (II). Mixtures of one or more polyhydric phenols are also suitably employed herein.

Preferably, the polyhydric phenol is a polyhydric phenolic compound of the general structural formula (III) wherein A is a divalent hydrocarbon radical having from 1 to 8 carbon atoms, each X is hydrogen, and n is 0. Most preferred of the polyhydric phenols is 2,2-

(4-hydroxyl phenyl) propane, commonly referred to as bisphenol A (BPA).

In preparing the aliphatic —OH containing adduct, the proportion of the polyhydric phenol, epoxy resin and aliphatic hydroxyl-containing amine components most advantageously employed is dependent on a variety of factors including the desired properties of the adduct, the desired properties of the powder coating composition and the coating prepared therefrom and the specific aliphatic —OH containing amine, epoxy resin and polyhydric phenol components employed. Specifically, the functionality of the adduct (i.e., aliphatic —OH groups and phenolic —OH or epoxy groups) is determined by the relative proportions of the aliphatic —OH containing amine, polyhydric phenol and epoxy resin components employed. For example, the adduct can be prepared having a combination of aliphatic hydroxyl groups and either (1) phenolic hydroxyl groups or (2) epoxy groups.

In one embodiment, the aliphatic hydroxyl-containing amine is reacted with an epoxy resin and a stoichiometric excess of a polyhydric phenol to form a compound containing aliphatic —OH groups and phenolic —OH groups. In preparing such adduct, the polyhydric phenol is employed in a stoichiometric excess when compared to the epoxy resin component. Advantageously, at least 1.2 equivalents of the polyhydric phenol are employed for each equivalent of epoxy resin component. In determining the equivalents of polyhydric phenol and epoxy resin to be employed, it is necessary to take into consideration the fact that the aliphatic —OH containing amine will react with the epoxy groups of the epoxy resin to reduce the epoxy functionality. Preferably, at least 1.5, more preferably at least 2, equivalents of the polyhydric phenol are employed per equivalent of epoxy resin, the epoxy resin equivalents being based on the number of epoxy groups which are not reacted with the amino hydrogens of the amine. The maximum amount of polyhydric phenol employed in preparing this adduct is generally dependent on the desired physical properties with less than 15, preferably less than 10, equivalents of polyhydric phenol being generally employed per equivalent of epoxy resin. Most preferably, the polyhydric phenol is employed in an amount from 2 to 5 equivalents for each equivalent of epoxy resin employed.

The aliphatic —OH containing amine is employed in an amount such that the resulting adduct contains on an average, at least one epoxy or one phenolic —OH group per molecule. Specifically, the reactive concentration of the amine can be higher when employing an epoxy resin having a high number of epoxy functional groups per molecule, e.g., the epoxy resin of structural formula II, than when an epoxy resin having only two epoxy groups such as the epoxy resin of formula (I) is employed.

In general, in preparing an adduct having phenolic —OH and terminal aliphatic —OH groups, the aliphatic —OH containing amine component is employed in an amount from 0.03 to 0.8 equivalent per equivalent of epoxy resin. Preferably, from 0.08 to 0.4 equivalent of the aliphatic —OH containing amine are employed per equivalent of epoxy resin. For the purposes of this invention, an equivalent of the aliphatic hydroxyl-containing amine is determined by the number of hydrogen atoms attached directly to the nitrogen atoms of the amine group which are capable of reacting with the epoxy resin component.

A particularly preferred adduct of the present invention containing terminal aliphatic —OH groups and phenolic —OH groups is prepared using from 10 to 55 weight percent of the diglycidyl ether of bisphenol A, from 90 to 35 weight percent of bisphenol A and from 1 to 10 weight percent of the aliphatic hydroxyl-containing amine, preferably diethanolamine.

In preparing an adduct having epoxy groups and aliphatic hydroxyl groups, from 0.4 to 0.9 equivalent of the polyhydric phenol component and from 0.002 to 0.2 equivalent of the aliphatic —OH containing amine for each equivalent of the epoxy resin component. Preferably, from 0.55 to 0.8 equivalent of the polyhydric phenol component and from 0.004 to 0.1 equivalent of the aliphatic —OH containing amine are employed per equivalent of the epoxy resin component.

A particularly preferred adduct of the present invention containing terminal aliphatic —OH groups and epoxy groups is prepared from 65 to 85 weight percent of the diglycidyl ether of bisphenol A, from 35 to 15 weight percent of bisphenol A and from 0.1 to 10 weight percent of the aliphatic —OH containing amine, preferably diethanolamine.

Alternatively, an adduct containing the epoxy and aliphatic hydroxyl groups can be prepared by the reaction of an epoxy resin with an aliphatic hydroxyl-containing amine. However, the formation of the adduct by this method is not preferred.

The adduct is prepared by subjecting a mixture of the desired amounts of the epoxy resin, the aliphatic hydroxyl-containing amine and, if employed, the polyhydric phenol at conditions sufficient to react the epoxy groups with the amino hydrogens of the aliphatic hydroxyl-containing amine and the —OH groups of the phenolic component, if employed, with the epoxy groups. Although no catalyst is required for the reaction of the epoxy groups with the amino hydrogen of the aliphatic —OH containing amine, optionally, the reaction mixture of the epoxy resin, aliphatic —OH containing amine and polyhydric phenol contains a catalyst for promoting the reaction of the epoxy groups with the phenolic groups.

Representative catalysts which are suitably employed in the preparation of the adduct include the alkali metal hydroxides such as sodium and potassium hydroxide; the onium compounds such as quaternary ammonium salts, e.g., tetramethylammonium hydroxide, or quaternary phosphonium salts, e.g., ethyl triphenyl phosphonium iodide; and tertiary amines and phosphines, e.g., benzyl dimethyl amine and triphenyl phosphine. Of these catalysts, the tertiary amines and onium compounds are generally most advantageously employed herein.

The amounts of catalyst advantageously employed in the reaction are dependent on a variety of factors including the desired physical and chemical properties of the adduct and the powder coating composition as well as the coating prepared therefrom and the conditions of the reaction employed in preparing the adduct. In general, the catalyst is employed in an amount from 0.005 to 0.5, advantageously from 0.02 to 0.2, weight percent based on the total weight of the epoxy resin, polyhydric phenol and aliphatic hydroxyl-containing components.

In general, the reaction is conducted neat, i.e., in the absence of a solvent or other liquid reaction diluent, by heating a mixture of the aliphatic hydroxyl-containing amine, epoxy resin and polyhydric phenol components to a temperature sufficient to melt the solid components and react the epoxy and hydroxyl groups. Although the temperature most advantageously employed in conducting the reaction is dependent on the specific reactants and catalyst employed, in general, temperatures from 100° to 250° C., preferably from 120° to 210° C., are employed in preparing the adduct.

Following preparation of the adduct, which is generally solid at room temperatures, it is blended with the other components to prepare the desired coating composition. It is not, in general, necessary or desirable to separate the adduct from any unreacted starting materials before incorporating it into the coating composition of the invention. When an adduct having aliphatic hydroxyl and epoxy groups is prepared, the resulting adduct is blended with a polyhydric phenol and optionally, additional amounts of epoxy resin, curing catalyst and other desired adjuncts. The preferred polyhydric phenols to be blended with the adduct containing aliphatic —OH and epoxy groups in the preparation of the coating composition are those as described previously in formulae (I) and (II). (Although not preferred, a curing agent for the epoxy resin such as dicyandiamide can be employed in addition to or as a substitute for the polyhydric phenol).

Alternatively, when the adduct has aliphatic hydroxyl and phenolic hydroxyl groups, the adduct is blended with an epoxy resin, preferably a solid epoxy resin, and, optionally, additional amounts of a polyhydric phenol, curing catalyst and desired adjuncts to form the desired powder coating composition.

The epoxy resins which are advantageously blended with the aliphatic hydroxyl/phenolic —OH containing adduct include the aromatic based epoxy resins represented by the general formula (I) wherein A and X are as described with reference to formula (I) but n has an average value from 1.5 to 15, preferably 2 to 6, and formula (II) wherein R and Y are the same as described with reference to formula (II) and m has an average value from 1 to 8. Epoxy resins prepared by reacting an aliphatic based epoxy resin with a polyhydric phenol can also be employed herein and include the reaction product of glycidyl ethers of aliphatic hydroxyl-containing compounds and polyhydric phenol. Representative aliphatic hydroxyl-containing compounds are ethylene glycol, propylene glycol, 1,4-butane diol, neopentyl glycol, dibromoneopentyl glycol, dichloroneopentyl glycol, glycerine, the oxyalkylated derivatives thereof such as oxypropylated, oxyethylated, oxybutylated derivatives, or mixtures thereof. Other suitable epoxy resins are those prepared by reacting a stoichiometric excess of an epoxy resin having more than one 1,2-epoxy group with a dimer carboxylic acid.

The preferred epoxy resins are the solid epoxy resins of formula (I) wherein each A is independently a divalent hydrocarbon group having from 1 to 6 carbon atoms, each X is independently hydrogen or bromine and n has an average value from 2 to 6; epoxy resins of formula (II) wherein R is hydrogen or an alkyl group having from 1 to 4 carbon atoms, Y is hydrogen or methyl and m has an average value from 1 to 8, and mixtures thereof.

In preparing a coating composition, the ratio of the various components depends upon the desired molecular weight and other desired properties of the coating prepared from the powder coating composition, and the specific components employed, e.g., the epoxy equivalent weight and phenolic hydroxyl equivalent weight of the various components.

In preparing a powder coating composition from an adduct containing both aliphatic and phenolic —OH groups, the aliphatic hydroxyl/phenolic hydroxyl-containing adduct and epoxy resin are preferably employed in amounts such that the powder coating composition contains from 45 to 95, preferably from 60 to 90, weight percent of the epoxy resin and from 55 to 5, preferably from 40 to 10, weight percent of the adduct containing the aliphatic and phenolic hydroxyl groups, said weight percents being based on the total weight of the solid epoxy resin and the adduct (including any unreacted starting materials which may be present).

In preparing a powder coating composition from an adduct containing both aliphatic hydroxyl and epoxy groups, the adduct is advantageously employed in an amount from 45 to 95, preferably from 60 to 90, weight percent and the polyhydric phenol in an amount from 55 to 5, preferably from 40 to 10, weight percent, said weight percents being based on the total weight of the polyhydric phenol and the adduct (including any unreacted starting materials which may be present).

Optionally, the powder coating composition further comprises a catalyst and other adjuncts. Suitable catalysts employed in the powder coating composition are those which are able to affect the reaction between the epoxy group of the epoxy resin and the phenolic hydroxyl groups of the adduct. These include the onium compounds such as the phosphonium and quaternary ammonium salts of organic and inorganic acids, imidazoles; imidazolines and tertiary amines and phosphines.

Of these catalysts, preferred catalysts are those catalysts which are solid at room temperature and include the imidazoles such as 2-styrylimidazole, 1-benzyl-2-methylimidazole, 2-methylimidazole, 2-butylimidazole and mixtures thereof; the solid phosphines such as triphenyl phosphine and phosphonium salts of an acid, acid ester or ester.

The catalysts are generally employed in quantities from 0.001 to 10, preferably from 0.05 to 5, weight percent based on the combined weight of the terminal aliphatic —OH containing adduct and other component(s) containing epoxy or phenolic —OH groups.

The coating composition can optionally contain adjuncts such as pigments, fillers, dyes and flow control agents. Adjuncts conventionally employed in preparing an epoxy resin, coating composition and their effects on the coating composition and the coating prepared therefrom are well-known in the art and reference is made thereto for the purposes of this invention.

In the preparation of the powder coating composition, the various reactive components (i.e., the aliphatic hydroxyl-containing adduct and the solid epoxy resin or polyhydric phenol component) are melted and the catalyst and other additional adjuncts mixed, preferably homogeneously, with the melted blend. Preferably, the mixing is conducted in an extruder at conditions sufficient to thoroughly mix the catalyst and other adjuncts throughout the melt to obtain the desired homogeneity. The molten powder coating composition is subsequently cooled and flaked and/or ground to form a solid mixture of particles having the desired size.

Once formed, the coating composition is applied to the substrate being coated by conventional techniques. For example, in coating metals with a powder coating composition, the powder coating composition is typically applied using electrostatic spray techniques. Alternatively, in coating either metal or non-metal substrates, the powder coating composition can be applied by sintering the powder coating from a fluidized bed onto a heated substrate or from aqueous suspension of the powder coating.

Once coated with the powder coating composition, the coated substrates are subjected to temperatures which are sufficient to react the epoxy groups with the phenolic hydroxyl groups and to fuse the coating. Although the temperature most advantageously employed for such reaction is dependent on the specific epoxy-containing component and phenolic hydroxyl-containing component, the temperature is advantageously between 100° and 350° C. More preferably, the curing temperature is from 120° to 300° C.

The specific curing time employed is dependent upon the temperature and the mass of the coated substrate. For example, a thin metallic substrate subjected to a temperature of 300° C. will require only a few seconds to effect and complete the curing reaction whereas a thicker metallic part such as an automobile body when subjected to a temperature of 100° C. will require upwards to 60 minutes to effect said curing reaction. In general, at such temperatures, curing will take between 10 seconds to 60 minutes and more typically from 10 seconds to 30 minutes.

The following examples are set forth to illustrate the invention and should not be construed to limit its scope. In the examples, all parts and percentages are by weight unless otherwise specified.

EXAMPLE 1

To a suitably sized glass vessel equipped with stirrer, heating mantle, temperature control means and nitrogen purge, was charged 37.9 parts of a commercially available diglycidyl ether of bisphenol A (0.203 equivalent), 53.1 parts of bisphenol A (0.465 equivalent) and 5 parts of diethanolamine (0.048 equivalent). This reaction mixture was heated to 90° C. When the reaction mixture has reached this temperature, 0.028 parts of a 70 percent solution of ethyl triphenyl phosphonium acetate acidic acid complex in methanol was added. The reaction mixture was subsequently heated to 150° C. and allowed to exotherm. The reaction was allowed to proceed for an additional 90 minutes to assure that the epoxy content of the reaction product was less than 0.5 percent. At this time, the reaction mixture was cooled to less than 140° C. Subsequently, 2 parts of 2-methylimidazole and 2 parts of a flow control agent were mixed into the reaction product. It was then cooled to room temperature and flaked. The flake material comprised an aliphatic hydroxyl/phenolic hydroxyl-containing adduct having essentially no epoxy groups.

A powder coating composition was prepared by co-extruding a blend of 17.5 parts of the thus prepared adduct with 42.5 parts of a solid epoxy resin having the general structural formula (I) wherein X is hydrogen, A is $C(CH_3)_2$ and the epoxy equivalent weight of 613, 39.5 parts of a titanium dioxide pigment and 0.5 part of a flow modifier. The resulting composition was flaked, ground and sieved.

EXAMPLE 2

An aliphatic hydroxyl/phenolic hydroxyl-containing adduct was prepared in an identical manner to Example 1 except that one part of diethanolamine (0.01 equivalent), 39.6 parts of a commercially available diglycidyl ether of bisphenol A (0.212 equivalent) and 55.4 parts of bisphenol A (0.486 equivalent) were employed. A powder coating composition was subsequently prepared having an identical composition to the powder coating composition of Example 1 except that it contained 21.3 parts of the resulting adduct and 38.7 parts of the solid epoxy resin.

EXAMPLE 3

An aliphatic hydroxyl phenolic hydroxyl-containing adduct was prepared in an identical manner to Example 1 except that 10 parts of diethanolamine (0.095 equivalent), 35.8 parts of a commercially available diglycidyl ether of bisphenol A (0.19 equivalent) and 50.2 parts of bisphenol A (0.44 equivalent) were employed. A powder coating composition was subsequently prepared having an identical composition to the powder coating composition of Example 1 except it contained 19 parts of the resulting reaction product and 41 parts of the solid epoxy resin.

EXAMPLE 4

To a suitably sized flask equipped stirrer, heating mantle, temperature control means and nitrogen purge, was charged 72.9 parts of a commercially available diglycidyl ether of bisphenol A (0.390 equivalent), 26.1 parts of bisphenol A (0.229 equivalent) and 1 part of diethanolamine (0.01 equivalent). This reaction mixture was heated to 90° C. When the reaction mixture reached this temperature, 0.05 part of a 70 percent solution of ethyl triphenyl phosphonium acetate acidic acid complex in methanol was added. The reaction mixture was subsequently heated to 140° C. and allowed to exotherm. The reaction was allowed to proceed for an additional 90 minutes to assure that the phenolic hydroxyl content of the reaction product was less than 0.5 percent. At this time, the reaction mixture was cooled and flaked.

There is no subsequent addition of catalyst or flow control agent to the reaction product. The flake material was a compound containing aliphatic hydroxyl groups and epoxy groups.

A powder coating composition was prepared by co-extruding a blend of 44.1 parts of the thus prepared adduct with 15.9 parts of a polyhydric hardener of the type of formula (III) wherein X is hydrogen, A is $C(CH_3)_2$ and having a phenolic hydroxyl equivalent weight of 267, (which includes 0.32 part of 2-methyl imidazole and 0.32 part of a flow control agent), 39.5 parts of a titanium dioxide pigment and 0.5 part of a flow modifier. The resulting composition was flaked, ground and sieved.

COMPARATIVE EXAMPLE A

A powder coating formulation is prepared by coextruding a blend of 44 parts of a commerially available digylcidyl ether identical to that employed in Example 1, 16 parts of a polyhydric hardener identical to that employed in Example 3 (including the imidazole catalyst and the flow control agent), 39.5 parts of titanium dioxide and 0.5 part of a flow modifier.

A series of coated panels was prepared from each of the powder coating compositions by applying the powder coating composition of Examples 1–4 and Comparative Example A to a series of thoroughly degreased mild steel panels (steel grade: ST12.03) using a spray gun and conventional electrostatic techniques. The powder coated panels were heated at 160° C. until the cured coating was able to resist 160 inch pounds (18.1 J) direct and reverse impact according to ASTM test method designated G14. The times required to obtain sufficient cure of the coating to resist such impacts was significantly less using the coating compositions of Examples 1 and 2 (8 minutes for the composition of Example 1, 9 minutes for the coating of Example 2) than with the coating composition of Comparative Example A (11 minutes cure time). The coating compositions of Examples 3 and 4 also required 11 minutes for sufficient cure.

The coating on the baked panels was tested by immersing the lower ⅔ part of a panel in deionized water maintained at 90° C. for 20 hours. The adhesion of the coating to each of the panels was evaluated immediately after removal of that panel from the water and also three hours after removal. The adhesion is tested by scribing a cross on the panel surface using a sharp knife and thereafter trying to peel the coating from the panel at the center of the cross. The testing of the panels that were aged for 20 hours showed the coatings prepared from the powder coating compositions of the present invention to have no loss in adhesion immediately after testing and following the three hour recovery period whereas the panel coated with the composition of Comparative Example A showed total loss of adhesion both immediately and three hours after removal from the water.

In addition, a phosphatized steel panel was coated with the powder coating composition of Example 1. For purposes of comparison, a second steel panel was coated with the coating composition of Comparative Example A. Both panels were subjected to 36 days immersion in deionized water maintained at 90° C. The adhesion of the coating to the phosphatized steel was then measured by the above-described techniques. There was no loss of adhesion of the coating composition of Example 1 after the 36 day immersion, either immediately upon removal from the water or after a three hour recovery period. The coating composition of Comparative Example A showed total loss of adhesion after the 36 days immersion, both immediately upon removal and after the three hour recovery period.

I claim:

1. A curable coating composition comprising (1) a component having more than one 1,2-epoxy group and (2) a component having more than one group reactive with the epoxy groups of component (1), wherein component (2) is an adduct formed by reacting an epoxy resin, a polyhydric phenol and an aliphatic hydroxyl-containing amine wherein at least 1.2 equivalents of the polyhydric phenol are employed for each equivalent of the epoxy resin, the equivalents of epoxy resin being based on the number of epoxy groups which are not reacted with the amino hydrogens of the aliphatic hydroxyl-containing amine, said adduct having terminal aliphatic —OH groups, and having epoxy groups or groups reactive with an epoxy group.

2. A method of coating a metal substrate, which method comprises applying to the metal substrate a powder coating composition as claimed in claim 1 using an electrostatic spray technique, and subsequently subjecting the substrate to a temperature sufficient to cure the coating.

3. The method as claimed in claim 2, wherein the powder coating and metal substrate are subjected to a temperature of from 100° to 350°C.

4. A metal substrate having on a surface thereof a cured coating of a composition as claimed in claim 1.

5. The composition of claim 1 wherein the groups reactive with an epoxy group are terminal phenolic groups.

* * * * *